J. I. CONKLIN, Jr.
ELECTRICAL RAILWAY-SIGNAL.
No. 191,836. Patented June 12, 1877.
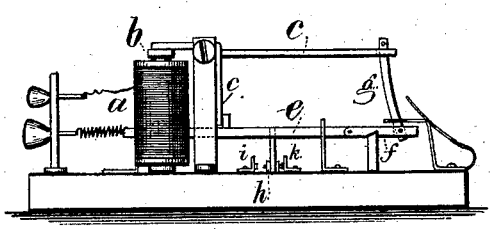
Fig. 2.
Fig. 1.
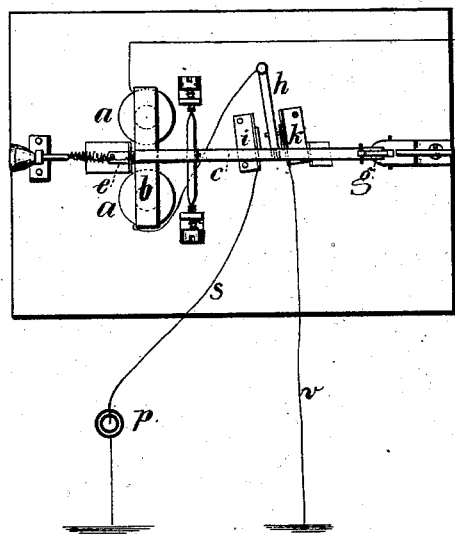
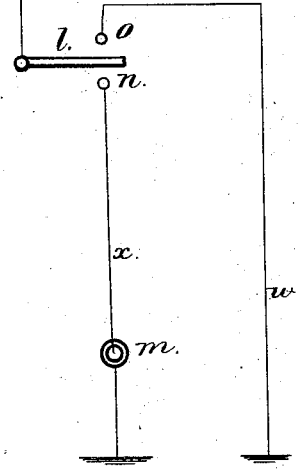
Witnesses,
Chas. H. Smith
Geo. T. Pinckney
Inventor
Joseph I. Conklin, Jr.
per Lemuel W. Serrell
Atty.

UNITED STATES PATENT OFFICE.

JOSEPH I. CONKLIN, JR., OF NEW YORK, ASSIGNOR TO HIMSELF AND CHARLES A. DRESSER, OF BROOKLYN, N. Y.

IMPROVEMENT IN ELECTRICAL RAILWAY-SIGNALS.

Specification forming part of Letters Patent No. 191,836, dated June 12, 1877; application filed November 14, 1876.

*To all whom it may concern:*

Be it known that I, JOSEPH I. CONKLIN, Jr., of the city and State of New York, have invented an Improvement in Railway-Signals, of which the following is a specification:

The object of this invention is to make use of one wire to move the signal either way to indicate danger or show the way clear.

The device is especially useful at switches, draw-bridges, &c., where there is a motion that is used to close a circuit to the ground in one direction, or to a battery in the other direction, and the signal-instrument is constructed in such a manner that it responds to the movement of the circuit-breaker. In the position of rest the two batteries are opposed to each other on the line; hence there is but little action or waste in the batteries. When the circuit-closer is moved the line is connected to earth and the danger-signal operated, and in so doing the instrument breaks its own circuit and connects to another ground. When the circuit-closer is moved the other way it connects a battery, which, passing the opposite way over the same line, operates the signal, and simultaneously breaks the ground-connection and closes the circuit to the opposing battery.

It will be evident that the normal position, or that of inaction, may be with both ground-connections to the line and the battery-circuits both broken.

In the drawing, Figure 1 is a plan of the instrument and the circuit-connections, and Fig. 2 is an elevation of the signal-instrument.

The electro-magnet $a$ is made to operate the armature $b$ and lever $c$, and this gives motion to the signal. Reference is hereby made to my Patent No. 183,642, as showing an arrangement of armature, lever, and signal generally similar to that herein employed. Hence the signal-instrument does not require further description, except to say that the sliding bar $e$ is provided with a latch, $f$, and it is unlatched by the swinging lifter $g$, and there is a circuit-closer, $h$, that is moved by the bar $e$, and closes the circuit to the spring $i$ in one direction and to the spring $k$ in the other direction, similar to the devices in said Patent No. 183,642. The spring $i$ is connected by $s$ to a battery, $p$, and the spring $k$ by $r$ to a ground, and the circuit-closer $h$ is connected to the magnet, and thence to the line $t$. The swinging circuit-closer $l$ illustrates a draw-bridge, switch, or other moving device that is connected at one end to the line $t$, and the other end moves between the two stops $n$ and $o$. The stop $o$ is connected by $w$ to a ground, and the stop $n$ by $x$ to a battery and ground.

When the closer $l$ is in contact with $n$ the two batteries oppose each other on the line $t$, and when it is moved to $o$ the battery $m$ is disconnected, and the battery $p$ energizes the electro-magnet, operating the signal and changing the circuit-closer $h$ to $k$, breaking the circuit to the battery $p$. When the circuit-closer $l$ is moved the other way to $o$ the battery $m$ is operative through the line $t$ and the magnet $a$, to change the signal the other way.

I claim as my invention—

The combination, with the signal and its circuit-changer $h$, of the battery-connections $s$ and $x$, ground-connections $v$ $w$, single main line $t$, and circuit-changer $l$, substantially as and for the purposes set forth.

Signed by me this 8th day of November, 1876.

J. I. CONKLIN, JR.

Witnesses:
 GEO. T. PINCKNEY,
 HAROLD SERRELL.